United States Patent Office 3,583,982
Patented June 8, 1971

3,583,982
PRODUCTION OF LACTAMS
Clifford William Capp, Ewell, Keith Warwick Denbigh, Epsom, Peter John Durston, Thames Ditton, and Brian Walton Harris, Horley, England, assignors to BP Chemicals U.K. Limited, London, England
No Drawing. Filed May 22, 1968, Ser. No. 731,291
Claims priority, application Great Britain, June 6, 1967, 2,607/67
Int. Cl. C07d 41/00, 41/06, 53/00, 87/54, 93/36
U.S. Cl. 260—239.3
48 Claims

ABSTRACT OF THE DISCLOSURE

Lactams are produced by heating a compound of formula,

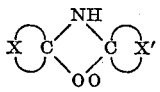

where X and X' are divalent aliphatic radicals which may be the same or different, in solution in a non-hydrocarbon organic solvent containing a salt of an element of Group I or II.

---

The present invention relates to a process for the production of lactams.

According to the present invention the process for the production of lactams comprises heating a solution of a compound of formula,

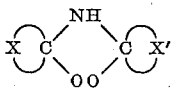  (I)

where X and X' are divalent aliphatic radicals which may be the same or different, in a non-hydrocarbon organic solvent containing a salt of an element of Group I or II.

Compounds of Formula I, hereinafter referred to as peroxyamines (I), and processes for their production are described in Belgian Pat. 701,327.

In each of radicals X and X' the number of carbon atoms which form part of each of the rings shown in the Formula I may for example vary from 4 to 11, i.e. the total number of carbon atoms which form part of each of the rings may be between 5 and 12. Examples of compounds of Formula I which may be used are those compounds where X and X' are radicals each having 4 to 6 carbon atoms in the ring. Examples of such compounds are, (a)

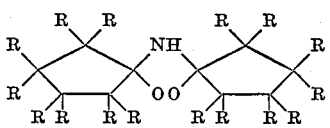

and (b)

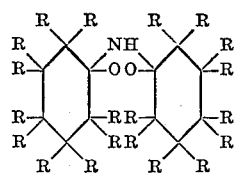

and (c)

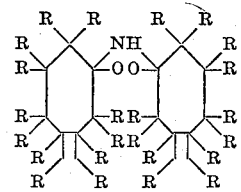

where each of the radicals R is alkyl or hydrogen. All the substituents in a ring need not be identical. For example one of the groups R may be methyl while the others are hydrogen.

The preferred compounds are those in which each of the radicals R is hydrogen or lower alkyl, e.g. having 1 to 5 carbon atoms such as methyl, ethyl, and propyl.

Specific examples of compounds which may be used are 1,1'-peroxydicyclopentylamine, 4,4'-dimethyl-1,1'-peroxydicyclohexylamine, 1,1'-peroxydicyclohexylamine and 1,1'-peroxydicycloheptylamine.

The reaction is carried out in the presence of a solvent so that the reaction mixture will contain a component in addition to the reactants and the reaction products. The solvent may be a solvent of high di-electric constant preferably one having a di-electric constant greater than 20, for example one having a di-electric constant greater than 25 (measured at 20° C.). The solvent may for example be a non-aromatic solvent. Examples of such solvents are the aliphatic hydroxy compounds, e.g. di- and poly-hydroxy compounds such as ethylene glycol, diethylene glycol and butane-1, 4-diol; substituted or unsubstituted alkanols such as methanol, ethanol, ethoxyethanol and tetrahydrofuryl alcohols. Examples of other solvents which may be used are the ketones, e.g. dialkyl ketones such as methyl ethyl ketone, methyl isobutyl ketone; and alkyl aryl ketones; e.g. acetophenone. Aldehydes may be used, e.g. n-hexaldehyde and also amides such as dimethyl formamide. Specific examples of other solvents which may be used are dimethyl sulphoxide, tetrahydrothiophen-1,1-dioxide, nitromethane, pyridine and dibutyl phthalate. Either a single solvent or a mixture of solvents may be used.

The salts contained in the solvent are preferably salts of Groups I-A and II-A of the Periodic Table of the elements appearing on page 30 of "Advanced Inorganic Chemistry" by Cotton and Wilkinson (1962). Examples of elements of Group I-A whose salts may be used are lithium, sodium and potassium. Examples of the salts of the elements of Group II-A which may be used are salts of magnesium, as well as the alkaline earth metals, e.g. calcium, barium, and strontium. These salts may be for example halides or thiocyanates.

Any given salt will generally give the best results when used in conjunction with a specific solvent or class of solvents. Among specific combinations of solvents and salts which are particularly satisfactory are dimethyl sulphoxide with lithium chloride, lithium bromide, lithium iodide, calcium chloride, magnesium chloride, potassium thiocyanate, the best salts being lithium chloride and bromide, calcium chloride, magnesium chloride and potassium thiocyanate; acetone and lithium bromide; methanol and lithium chloride, sodium chloride, calcium chloride, strontium chloride and strontium bromide, of which the best are lithium chloride and calcium, barium and strontium chloride and strontium bromide; ethanol and lithium bromide and chloride; ethylene glycol and potassium fluoride; diethylene glycol and potassium bromide; dihydroxy compounds such as ethylene glycol, diethylene glyketone and lithium bromide; methyl isobutyl ketone and lithium chloride; acetophenone and lithium bromide; ethoxyethanol and lithium bromide; and tetrahydrofurfuryl alcohol and lithium bromide. Of these the best combinations appear to be lithium bromide with methyl ethyl ketone, methyl isobutyl ketone, acetone, acetophenone, methanol, ethanol or acetonitrile; and lithium chloride with ethanol, dimethylformamide, or dimethyl sulphoxide.

The quantity of solvent used to prepare the solution of the peroxyamine (I) is preferably sufficient to dissolve all the peroxyamine and salt fed to the reaction mixture. The concentration of the peroxyamine in the solution may vary over a moderately wide range for example from 0.1 to 5.0 moles/litre. The concentration of the salt in the solution may also vary over a moderately wide range for example from 0.1 mole/litre to the saturation concentration which will of course vary with the salt and solvent used. The molar ratio of peroxyamine to the salt may vary widely.

The temperature to which the solution of the peroxyamine is heated may vary over a moderately wide range for example between 50° and 161° C. The solution may for example be heated to a temperature of at least 65° C. while it may be desirable to heat the solution to no more than 120° C. or even 100° C. The optimum reaction temperature may vary with the peroxyamine, solvent and salt used but can be found by simple tests.

The time for which the solution is heated will depend upon the reaction conditions for example the temperature of the solution but in a batch reaction it will generally vary between say 5 minutes to 5 hours. The reaction can be carried out batchwise or continuously.

The lactam formed by the process of the present invention will of course depend upon the nature of the two rings of which the radicals X, X' form part. The number of carbon atoms in the ring of the lactam molecule will correspond to the number of carbon atoms in the ring of the peroxyamine from which it was formed. Where the rings carry alkyl substituents alkyl substituted lactams will be formed. Thus 1,1'-peroxydicyclohexylamine which has unsubstituted 6-membered rings gives caprolactam while 3,3' - dimethyl 1,1' - peroxydicyclohexylamine prepared from 3-methylcyclohexanone by reaction with ammonia and hydrogen peroxide, and which has alkyl substituted 6-membered rings, gives a mixture of 3-methylcaprolactam and 5-methylcaprolactam.

The lactam can be recovered by any suitable method. In some cases much of the salt crystallizes out on cooling the solution at the end of the reaction and is separated by filtration. Whether or not the salt crystallizes out it may be possible to separate the solvent, lactam, cyclic ketone and other products by distillation. Any residual salt may be recovered by extracting the residue left after distillation with a minimum amount of water, separating off the aqueous layer and then evaporating off the water to give the salt, which may be recycled to the reaction.

Alternatively the reaction mixture may be diluted with water and then extracted with a liquid which is immiscible with water and is a solvent for the lactam. Examples of suitable solvents are aromatic compounds e.g. benzene and xylene, aliphatic hydrocarbons e.g. petroleum distillate and chlorinated hydrocarbons, especially the chlorinated lower aliphatic hydrocarbons e.g. methylene chloride, carbon tetrachloride, chloroform, dichloroethane. Ethers may also be used. The lactam may be recovered from the extract by for example distilling off the solvent used to extract it while the salt may be recovered from the aqueous layer, resulting from the addition of water, by evaporating off the water.

The invention will now be illustrated by the following examples in which all the temperatures are in degrees Celsius.

EXAMPLE 1

A series of experiments was carried out in which metal salts and 1,1'-peroxydicyclohexylamine were dissolved in various solvents and heated. The reaction product was diluted with water, extracted successively with chloroform and the chloroform extract analyzed. The quantities of salt, 1,1'-peroxydicyclohexylamine and solvent, the reaction conditions, and the results obtained are given in Table 1. The solvents used were dimethyl sulphoxide (DMSO), methanol (MeOH) acetone, and methyl ethyl ketone (MEK). The products obtained were caprolactam (CL), cyclohexanone (CH). The yields quoted in the table are expressed as moles of product per 100 moles of 1,1'-peroxydicyclohexylamine fed or charged to the reaction. The peroxyamine conversion is the proportion of the 1,1'-peroxydicyclohexylamine fed to the reaction converted to products.

EXAMPLE 2

Lithium bromide (5.14 g.) and 1,1'-peroxydicyclohexylamine (5 g.) in methyl ethyl ketone (25 ml.) were refluxed for 2 hours. The reaction mixture was extracted with chloroform and the extract analyzed as in Example 1. The yields of caprolactam, cyclohexanone, and caproamide were 83.2%, 94% and 3.1% respectively.

EXAMPLE 3

A series of experiments was carried out as in Example 1 using 5 grams of 1,1'-peroxydicyclohexylamine with lithium bromide as the salt and various solvents. The reaction conditions and results are given in Table 2.

TABLE 1

| Metal salt used | Weight (g.) | 1,1'-peroxydicyclohexylamine (g.) | Solvent | Vol. (ml.) | Reaction conditions Temp. (° C.) | Time (hrs.) | Peroxyamine conversion (percent) | Yield CL | Yield CH |
|---|---|---|---|---|---|---|---|---|---|
| LiCl | 5.0 | 10.0 | DMSO | 40 | 110 | 2 | 100 | 84.6 | 91 |
| LiCl | 5.0 | 10.0 | DMSO | 40 | 90 | 10 | 95.4 | 86.9 | 94.3 |
| LiBr | 4.2 | 10.0 | DMSO | 40 | 110 | 2 | 87 | 68.0 | 86.0 |
| LiI·H₂O | 7.2 | 10.0 | DMSO | 40 | 110 | 2 | 93 | 51.4 | 81 |
| CaCl₂ | 5.3 | 10.0 | DMSO | 40 | 110 | 2 | 100 | 61.8 | 36.7 |
| MgCl₂ | 2.0 | 10.0 | DMSO | 40 | 110 | 2 | 100 | 69.4 | 32.6 |
| LiCl | 5.0 | 10.0 | MeOH | 40 | 110 | 2 | 100 | 74.4 | 80.0 |
| LiCl | 10.0 | 10.0 | MeOH | 40 | 92 | 0.5 | 100 | 78.9 | 93.8 |
| NaCl | 2.8 | 10.0 | MeOH | 40 | 110 | 2 | 93.1 | 58.4 | 73.0 |
| CaCl₂ | 5.3 | 10.0 | MeOH | 40 | 110 | 2 | 86.2 | 75.7 | 56.3 |
| LiBr | 2 | 10.0 | Acetone | 40 | 110 | 2 | 100 | 89.8 | 98.1 |
| AgOAc | 2 | 10.0 | DMSO | 40 | 110 | 2 | 100 | 43.6 | 60 |
| KCNS | 9.7 | 5.0 | DMSO | 25 | 130 | 1 | 100 | 62.1 | 100.5 |
| NaCNS | 11.8 | 5.0 | DMSO | 25 | 140 | 1 | 100 | 46 | 90.7 |
| LiCNS | 7.9 | 5.0 | DMSO | 25 | 120 | 1 | 100 | 40.5 | 93.4 |
| LiNO₃·H₂O | 5.15 | 5.0 | DMSO | 20 | 130 | 2 | 100 | 44.3 | 79.9 |
| LiBr | 50 | 100 | MeOH | 100 | 104 | 1.5 | 100 | 81.7 | 98.3 |
| LiBr¹ | 50 | 100 | EtOH | 100 | 104–110 | 1.7 | 99.5 | 85.4 | 99.5 |
| LiCl | 24.4 | 100 | EtOH | 100 | 105–108 | 3.9 | 100 | 78.3 | 85.0 |
| KF | 3 | 50 | Ethylene glycol | 50 | 120 | 1.3 | 100 | 48.2 | 89.9 |
| LiBr | 10 | 10 | MeCN | 40 | 110 | 2½ | 90 | 78.7 | 103 |
| SrCl₂ | 5 | 5 | MeOH | 40 | 110 | 2½ | 100 | 60 | 88 |

TABLE 1—Continued

| Metal salt used | Weight (g.) | 1,1'-peroxy-dicyclohexyl-amine (g.) | Solvent | Vol. (ml.) | Reaction conditions Temp. (° C.) | Time (hrs.) | Peroxyamine conversion (percent) | Yield CL | Yield CH |
|---|---|---|---|---|---|---|---|---|---|
| SrBr₂ | 5 | 5 | MeOH | 40 | 110 | 2 | 100 | 67 | 91.5 |
| KBr | 5.9 | 10 | Digol (diethylene glycol) | 40 | 110 | 2½ | 100 | 72 | 91.5 |
| LiCl | 2.0 | 10 | Dimethylformamide | 40 | 110 | 2 | 98 | 77.6 | 96.4 |
| LiCl | 2.0 | 10 | Tetrahydrothiophen-1,1-dioxide | 40 | 110 | 2 | 100 | 69 | 92.4 |
| KF | 5.0 | 5.0 | Diethylene glycol | 40 | 110 | 3 | 98 | 66.0 | 90.3 |
| Na₃PO₄ | 10.0 | 10.0 | MeOH | 40 | 110 | 2 | 95 | 50.0 | 95 |
| CaSO₄ | 5.0 | 5.0 | MeOH | 40 | 110 | 2.5 | 91 | 40.0 | 96 |
| KCN | 5.0 | 10.0 | MeOH | 30 | 80 | 30 | 98 | 43.0 | 66 |

₁ 10.7 g. sodium E.D.T.A.
₂ 10.7 g. sodium E.D.T.A.

TABLE 2

| Solvent (25 ml.) | Weight LiBr (grm.) | Temp. (° C.) | Time (hrs.) | Yield (percent mole) CH | Yield (percent mole) CL |
|---|---|---|---|---|---|
| Methyl ethyl ketone | 5.1 | 70-80 | 2 | 101 | 85 |
| Dimethyl sulphoxide | 5.1 | 130 | 2 | 89.4 | 67.8 |
| Cyclohexanone | 5.1 | 100 | 2 | | 50.0 |
| Acetophenone | 4.35 | 130 | 2 | 80.7 | 80.0 |
| Methyl isobutyl ketone | 4.35 | 130 | 2 | 78.6 | 81.8 |
| n-Amyl methyl ketone | 8.70 | 130 | 2 | 90.0 | 74.0 |
| Acetylacetone | 4.35 | 139 | 2 | 74.2 | 73.6 |
| n-Hexaldehyde | 4.35 | 131 | 1 | | 57.0 |
| Pyridine | 1.30 | 115 | 2 | 119 | 71.5 |
| Nitromethane | 1.30 | 161 | 2 | 33.4 | 51.0 |
| Cellosolve (ethoxyethanol) | 5,10 | 130 | 2 | 71.0 | 75.0 |
| Tetrahydrofurfuryl alcohol | 5.10 | 130 | 2 | 91.0 | 78.0 |
| Butane-1,4-diol | 5.10 | 130 | 0.7 | 72.0 | 62.0 |
| Dibutyl phthalate | 5.10 | 130 | 0.7 | 60.0 | 64.0 |
| Terpineol | 5.10 | 130 | 1 | | 57.0 |
| Geraniol | 5.10 | 130 | 1 | | 52.0 |

We claim:
1. The process for the production of lactams which comprises heating a solution of a compound of the formula:

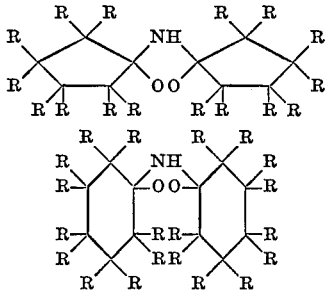

or

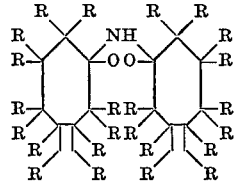

wherein R is hydrogen or lower alkyl of 1 to 5 carbon atoms, in a non-hydrocarbon organic solvent containing a salt selected from the group consisting of lithium, sodium, potassium, magnesium, calcium, barium and strontium halide or thiocyanate.

2. The process according to claim 1 wherein R is hydrogen, methyl, ethyl or propyl.

3. The process according to claim 1 wherein the compound has the formula,

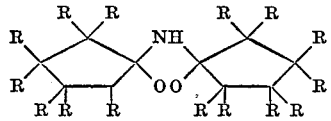

wherein each of R is lower alkyl of 1 to 5 carbon atoms or hydrogen.

4. The process according to claim 1 wherein the compound has the formula,

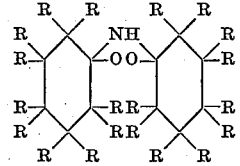

wherein each of R is lower alkyl of 1 to 5 carbon atoms or hydrogen.

5. The process according to claim 1 wherein the compound has the formula,

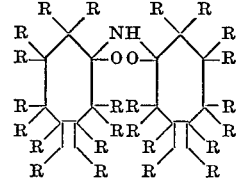

wherein each of R is lower alkyl of 1 to 5 carbon atoms or hydrogen.

6. The process according to claim 4 wherein the compound is 1,1'-peroxydicyclohexylamine.

7. The process according to claim 1 wherein the solvent has a high dielectric constant.

8. The process according to claim 7 wherein the solvent has a dielectric constant greater than 20.

9. The process according to claim 8 wherein the solvent has a dielectric constant greater than 25.

10. The process according to claim 7 wherein the solvent is a non-aromatic solvent.

11. The process according to claim 1 wherein the solvent is an aliphatic hydroxy compound.

12. The process according to claim 11 wherein the solvent is a di- or poly-hydroxy compound.

13. The process according to claim 12 wherein the solvent is ethylene glycol, diethylene glycol or butane-1,4-diol.

14. The process according to claim 11 wherein the solvent is a substituted or unsubstituted alkanol.

15. The process according to claim 14 wherein the alkanol is methanol, ethanol or ethoxyethanol.

16. The process according to claim 10 wherein the solvent is tetrahydrofurfuryl alcohol.

17. The process according to claim 1 wherein the solvent is a ketone.

18. The process according to claim 17 wherein the ketone is a dialkyl ketone.

19. The process according to claim 18 wherein the ketone is methyl ethyl ketone.

20. The process according to claim 18 wherein the ketone is methyl isobutyl ketone.

21. The process according to claim 17 wherein the ketone is an alkyl aryl ketone.

22. The process according to claim 21 wherein the alkyl aryl ketone is acetophenone.

23. The process according to claim 1 wherein the solvent is an amide.

24. The process according to claim 23 wherein the amide is dimethyl formamide.

25. The process according to claim 9 wherein the solvent is dimethyl sulphoxide.

26. The process according to claim 7 wherein the solvent is tetrahydrothiophen-1,1-dioxide.

27. The process according to claim 9 wherein the solvent is nitromethane.

28. The process according to claim 1 wherein the solvent is pyridine.

29. The process according to claim 6 wherein the solvent is dibutyl phthalate.

30. The process according to claim 1 wherein a single solvent is used.

31. The process according to claim 1 wherein the salt is a lithium salt.

32. The process according to claim 1 wherein the salt is a sodium salt.

33. The process according to claim 1 wherein the salt is a potassium salt.

34. The process according to claim 1 wherein the salt is a magnesium salt.

35. The process according to claim 1 wherein the salt is a calcium, barium, or strontium salt.

36. The process according to claim 1 wherein the salt is a halide.

37. The process according to claim 1 wherein the salt is a thiocyanate.

38. The process according to claim 1 wherein the quantity of solvent is sufficient to dissolve all the peroxyamine and salt fed to the reaction mixture.

39. The process according to claim 1 wherein the concentration of the peroxyamine in the solution is at least 0.1 mole/litre.

40. The process according to claim 39 wherein the concentration of the peroxyamine in the solution is in the range 0.1 to 5.0 mole/litre.

41. The process according to claim 1 wherein the concentration of salt in the solution is at least 0.1 mole/litre.

42. The process according to claim 1 wherein the solution is heated to a temperature in the range 50° to 161° C.

43. The process according to claim 42 wherein the solution is heated to a temperature of at least 65° C.

44. The process according to claim 43 wherein the solution is heated to a temperature of not more than 120° C.

45. The process according to claim 44 wherein the solution is heated to a temperature of not more than 100° C.

46. The process according to claim 1 wherein the solution is heated for a time in the range 5 minutes to 5 hours.

47. The process according to claim 1 wherein the lactam is recovered by distillation.

48. The process according to claim 1 wherein the lactam is recovered by solvent extraction of the reaction product.

References Cited

Roberts et al.: "Basic Principles of Organic Chemistry," pp. 384–386 (1964) (Benjamin).

Derwents: "Belgian Patents Report," abstracting Belgian Patent 704,214, granted Sept. 22, 1967.

HENRY R. JILES, Primary Examiner

R. T. BOND, Assistant Examiner

U.S. Cl. X.R.

260—294.7, 404.5